J. A. PAULSON.
QUACK GRASS DESTROYER.
APPLICATION FILED DEC. 7, 1909.
968,684.
Patented Aug. 30, 1910.
2 SHEETS—SHEET 1.
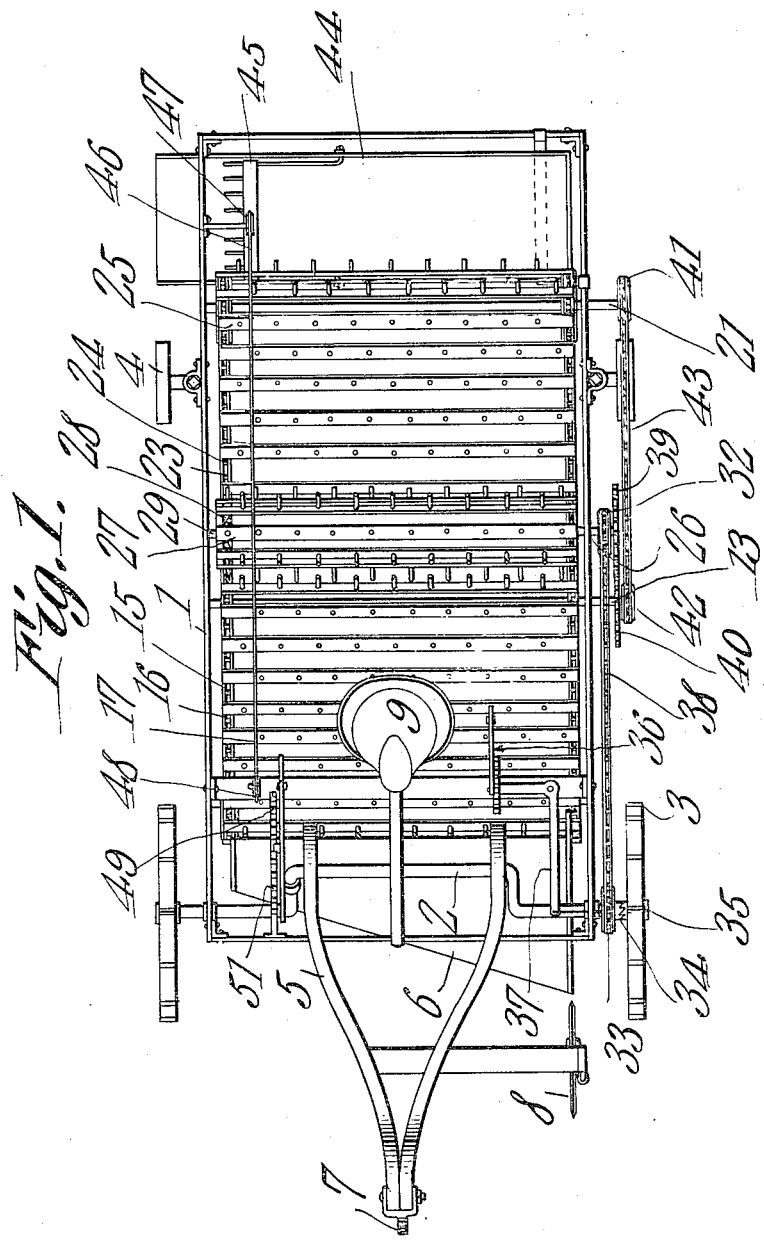
Witnesses
Inventor
John A. Paulson.
By C. A. Snow & Co.
Attorneys

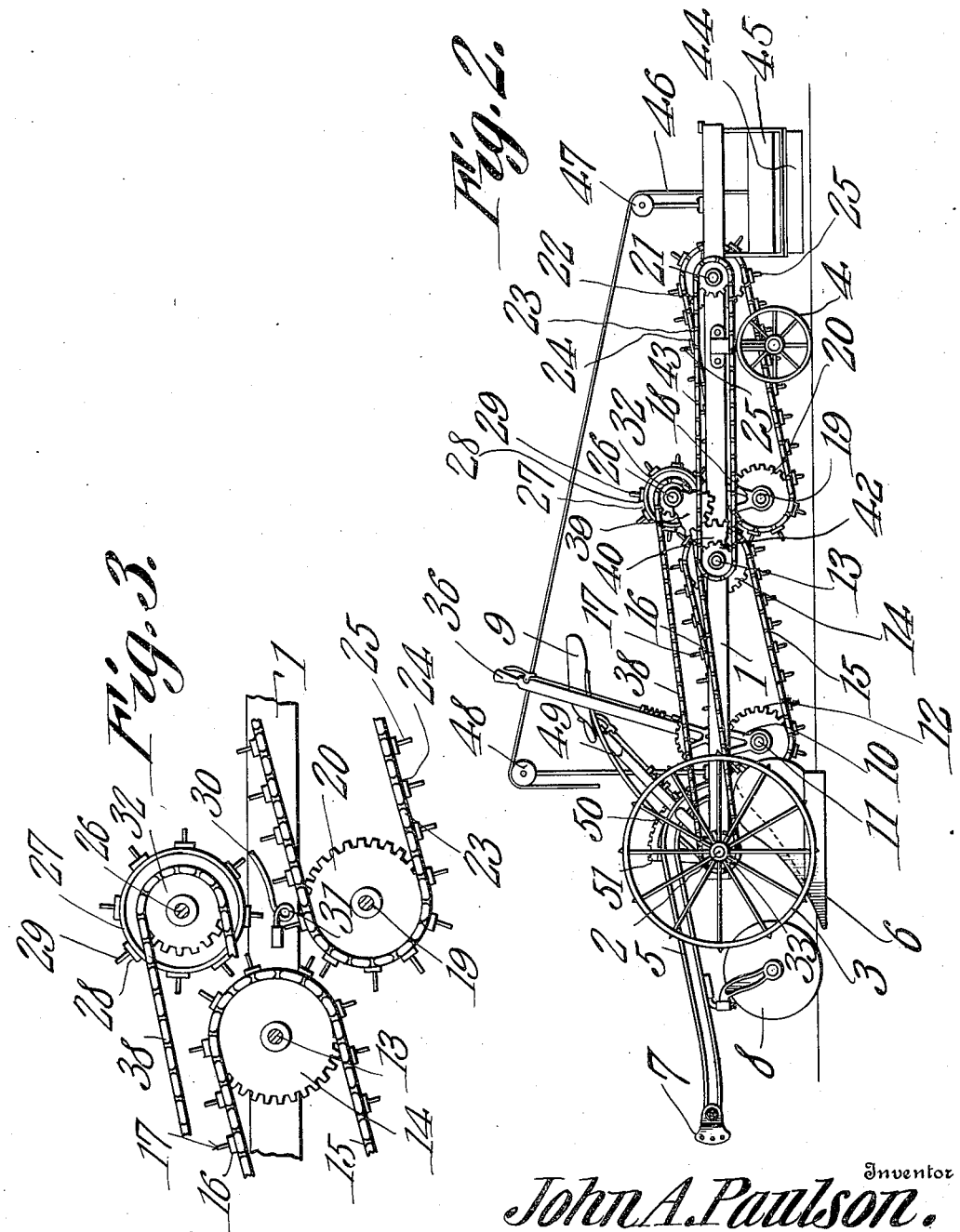

UNITED STATES PATENT OFFICE.

JOHN A. PAULSON, OF RIVER FALLS, WISCONSIN, ASSIGNOR OF ONE-HALF TO ANTHON A. PAULSON, OF RIVER FALLS, WISCONSIN.

QUACK-GRASS DESTROYER.

968,684.  Specification of Letters Patent. Patented Aug. 30, 1910.

Application filed December 7, 1909. Serial No. 531,841.

*To all whom it may concern:*

Be it known known that I, JOHN A. PAULSON, a citizen of the United States, residing at River Falls, in the county of Pierce and State of Wisconsin, have invented a new and useful Quack-Grass Destroyer, of which the following is a specification.

This invention has relation to destroyers especially adapted to be used upon fallow soil for removing quack and other objectionable grasses and it consists in the novel construction and arrangement of its parts as hereinafter shown and described.

The object of the invention is to provide a destroyer of the character indicated which is adapted to be drawn over the soil by draft animals and which is provided with a share adapted to dig and lift the roots of the grass and deposit the same upon an inclined foraminous conveyer. As the said roots pass along the conveyer much of the soil is sifted through the conveyer and at the upper end of the conveyer is arranged a shaker or agitator which engages the grass and roots and shakes the same and deposits them upon a second inclined conveyer. The said second conveyer is also foraminous and the remaining soil is sifted from the roots and blades of grass. The roots and blades of grass are deposited in a receptacle and means are provided for dumping an accumulation of grass at the side of the furrow made by the implement at desired points or intervals.

In the accompanying drawings,—Figure 1 is a top plan view of the destroyer. Fig. 2 is a side elevation of the same. Fig. 3 is a detail and enlarged sectional view of the intermediate portion of the destroyer showing the adjacent end of the conveyer and the shaker.

The destroyer consists of a frame 1 which is mounted at its forward portion upon a crank axle 2 which in turn is supported by wheels 3. Caster wheels 4 support the rear portion of the said frame 1. Beams 5 are mounted upon the intermediate crank portion of the axle 2 and at their rear ends carry a share or digger 6. The forward ends of the beams 5 are brought together and are provided with a clevis 7 to which the draft animals are attached. A colter 8 is supported by the beams 5 and is positioned to move in front of one edge of the share 6 in the usual manner. An operator's seat 9 is mounted upon the frame 1.

Brackets 10 depend from the forward portion of the frame 1 and a shaft 11 is journaled for rotation therein. Sprocket wheels 12 are fixed to the said shaft 11 and a shaft 13 is journaled for rotation at the intermediate portion of the frame 1. Sprocket wheels 14 are fixed to the intermediate portion of the shaft 13 and chains 15 pass around the sprocket wheels 12 and 14. The said chains 15 are connected together by spaced cross slats 16 upon which are mounted pins 17. The said chains and slats together with the pins constitute a foraminous conveyer with its upper run in an inclined position. The lower end of the said conveyer is immediately behind the upper rear edge of the share or digger 6. Brackets 18 depend from the intermediate portion of the frame 1 and a shaft 19 is journaled for rotation in the last said brackets. Sprocket wheels 20 are fixed to the intermediate portion of the shaft 19 and a shaft 21 is journaled for rotation at the rear end portion of the frame 1. Sprocket wheels 22 are fixed to the intermediate portion of the shaft 21, and chains 23 pass around the sprocket wheels 20 and 22. The said chains 23 are connected together by spaced cross slats 24 upon which are mounted pins 25. The chains 23, slats 24, and pins 25 constitute a second foraminous conveyer and the forward end of which is disposed below the rear end of the first said conveyer and the last said conveyer is upwardly inclined toward the rear end of the frame 1. A shaft 26 is journaled for rotation at the intermediate portion of the frame 1 and carries a reel 27 having at its periphery spaced slats 28 carrying pins 29. Concaved fingers 30 are attached at their forward ends to a cross bar of the frame 1 and lie under the reel 27. The said fingers 30 are formed from spring metal and are provided at intermediate points with coils 31 adapted to increase their spring or elasticity. A sprocket 32 is fixed to the shaft 26 and a sprocket wheel 33 is journaled for rotation upon one end portion of the axle 2. The said wheel 32 is provided with a clutch hub 34 which in turn is adapted to engage a clutch hub 35 carried by one of the wheels 3. A lever 36 is fulcrumed upon the frame 1 and is pivotally connected with a rocker 37 which in turn is pivoted upon the frame 1 and at its forward end engages the wheel 33 and is adapted to shift the hub 34 laterally along the axle 2 when the said lever 36 is swung. Thus means are provided for throwing the wheel 33 in and out of gear with relation to the adjacent wheel 3. A sprocket chain 38 passes around the sprocket wheels 32 and 33 and is adapted to transmit rotary movement to the wheel 32 and the shaft 26 upon which it is mounted. A gear wheel 39 is mounted upon the shaft 26 and meshes with a gear wheel 40 mounted upon the shaft 13. Thus means are provided for transmitting rotary movement from the shaft 26 to the shaft 13 which, in turn, actuates the forward conveyer of the machine. A sprocket wheel 41 is fixed to the shaft 21 and a sprocket wheel 42 is fixed to the shaft 13. A sprocket chain 43 passes around the sprocket wheels 41 and 42 and is adapted to transmit rotary movement from the shaft 13 to the shaft 21, which in turn, actuates the rear conveyer of the machine.

A chute 44 is suspended at the rear end of the frame 1 and is in an inclined position with its discharge or lower end disposed at one side of the said frame. A gate 45 is pivotally mounted at one end portion of the said chute 44 and one end of a cable 46 is attached to the intermediate portion of the said gate 45. From the gate the said cable passes over a sheave 47 journaled upon the frame 1 and then to a sheave 48 located at the forward portion of the frame 1 and has its forward end located within convenient reach of one occupying the seat 9. A lever 49 is fixed to the intermediate crank portion of the axle 2 and is provided with a spring actuated pawl 50 adapted to engage the teeth of a segment 51 which is mounted upon the forward portion of said frame 1. It will be seen that by springing the said lever 49, the intermediate crank portion of the axle 2 will be turned about the axis of the said axle and consequently means are provided for raising or lowering the rear end portions of the beams 5 so as to cause the share 6 to operate at any desired distance below the surface of the soil.

From the above description it will be seen that as the machine is drawn along the ground, the share 6 will pass under the roots of the grasses and the said roots together with the top soil will be passed back upon the upper run of the forward conveyer of which slats 16 form component parts. As the material passes along the upper run of said conveyer the soil will sift down through the spaces between the slats while the roots and blades of the grass will be carried up toward the reel 27. The said reel 27 may be so geared as to turn in either direction, and a variation in the rotation of the reel may be accomplished by crossing the chain 38 instead of having the same straight as illustrated in the accompanying drawings. In the present instance the forward portion of the reel turns in a downward direction and consequently when the teeth 29 carried by the slats 28 engage the grasses and roots they are carried down along the fingers 30 and are subjected to a shaking action which frees the soil from the roots and the grasses and the material is then passed upon the upper run of the rear conveyer of which the slats 24 form component parts. As the material passes along the run of the rear conveyer of the machine, the remaining soil is sifted from the roots and grasses and falls to the ground while the roots and grasses are carried back and deposited in the chute 44. When a quantity of material has accumulated in the chute 44, the operator may pull the cable 46 which will lift the gate 45 and thus the said material may fall from the delivering end of the chute in a pile upon the surface of the ground and at the side of the furrow made by the share 6. The material thus collected in piles may be destroyed by fire or other means at subsequent times.

Having described the invention what I claim and desire to secure by Letters Patent is:—

In a destroyer, a conveyer, a second converey having its receiving end located behind and below the delivery end of the first said conveyer, resilient fingers located at the adjacent ends of said conveyers, and a shaker journaled for rotation above the fingers and having radially disposed pins which are spaced at their ends above the upper sides of the fingers and adapted to engage material coming from the first said conveyer and pass the same over the fingers to the second said conveyer.

In testimony that I claim the foregoing as my own, I have hereto affixed my signature in the presence of two witnesses.

JOHN A. PAULSON.

Witnesses:
 CHRIS N. WIGER,
 R. MCGREGOR.